W. J. BELL.
SCREENING DEVICE.
APPLICATION FILED NOV. 3, 1916.
1,247,620.
Patented Nov. 27, 1917.
5 SHEETS—SHEET 1.
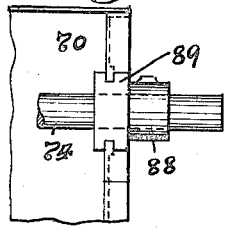
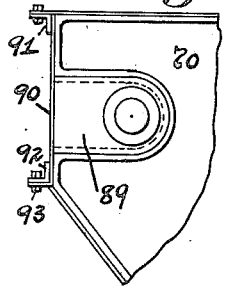
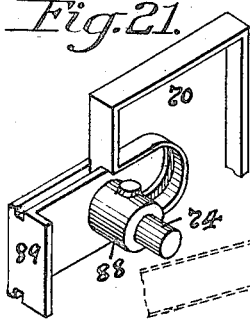
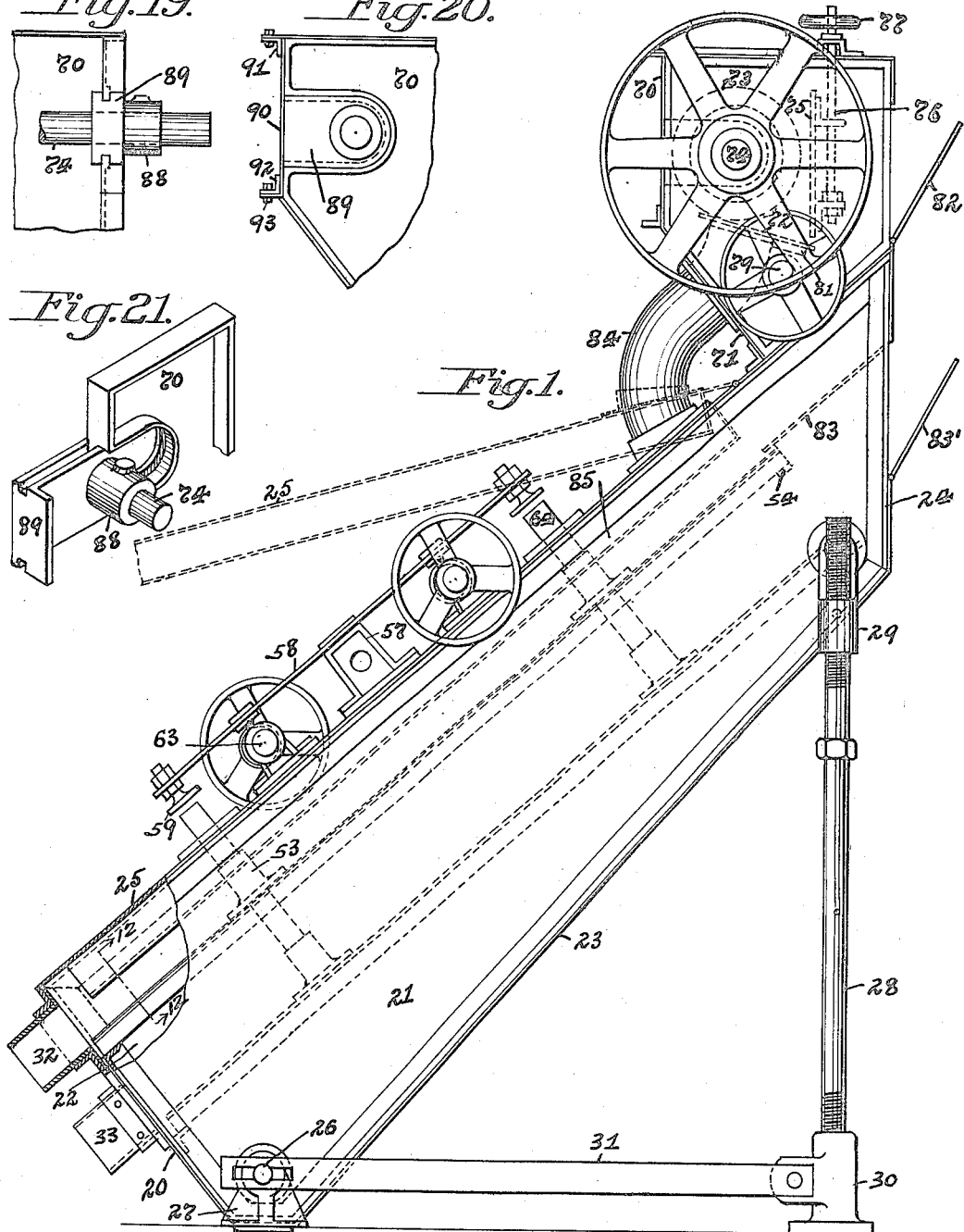
Witnesses
J. M. Geoghegan.
F. E. Broderick.
Inventor
Willard J. Bell,
By J. N. Cooke
Attorney.

W. J. BELL.
SCREENING DEVICE.
APPLICATION FILED NOV. 3, 1916.
1,247,620.
Patented Nov. 27, 1917.
5 SHEETS—SHEET 2.
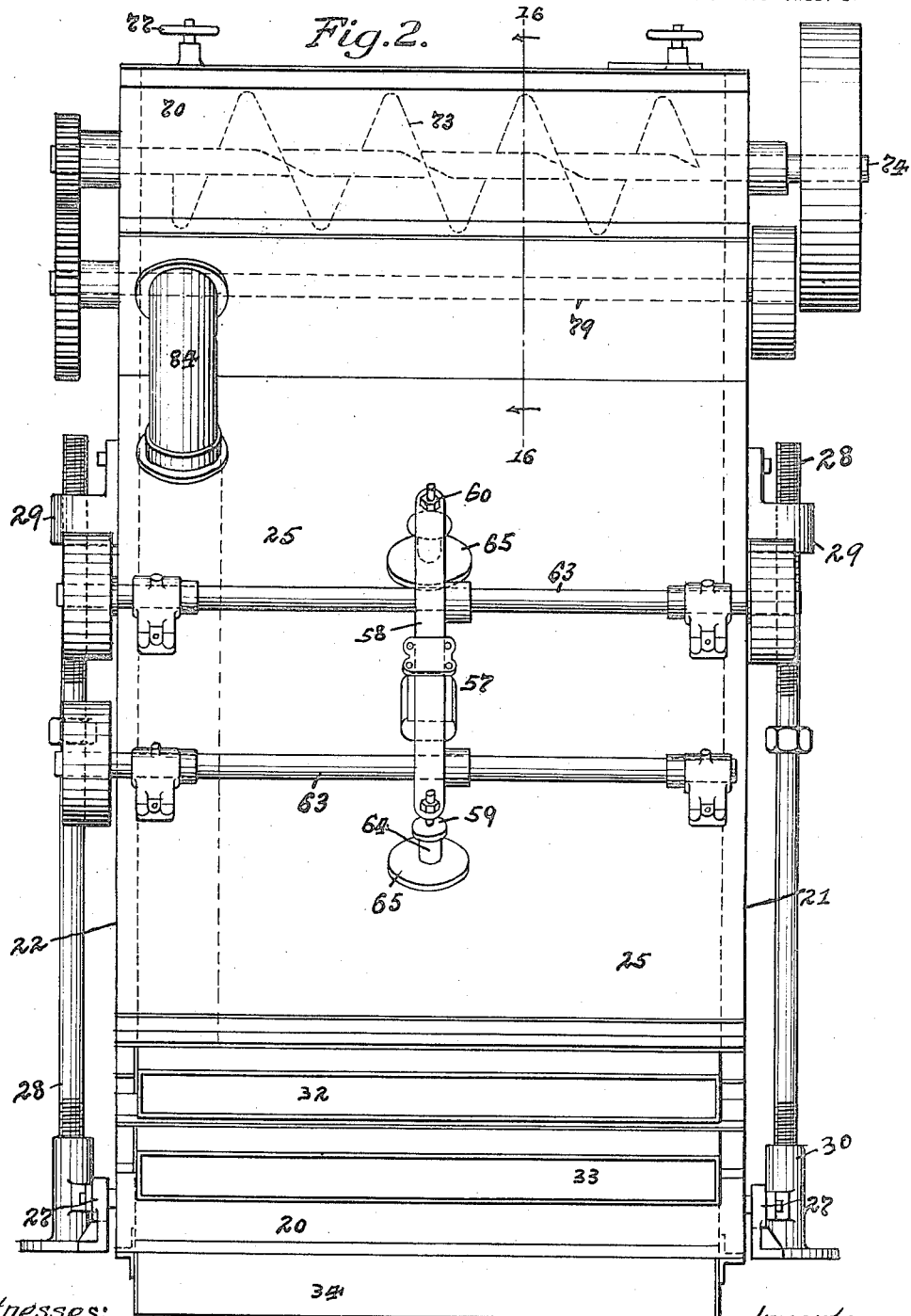
Witnesses:
J. M. Geoghegan.
F. E. Broderick.
Inventor
Willard J. Bell,
By J. W. Cooke
Attorney.

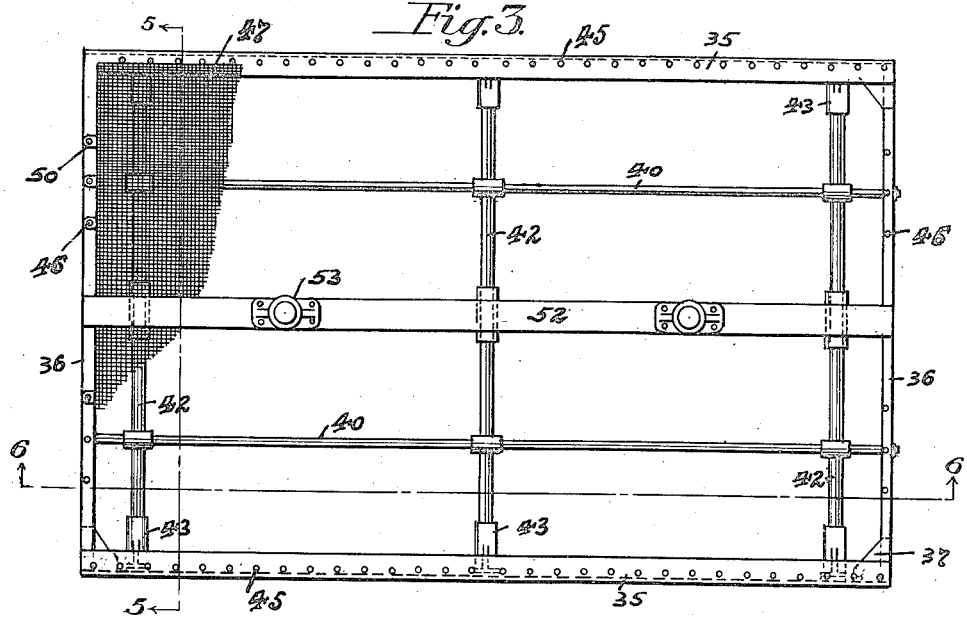
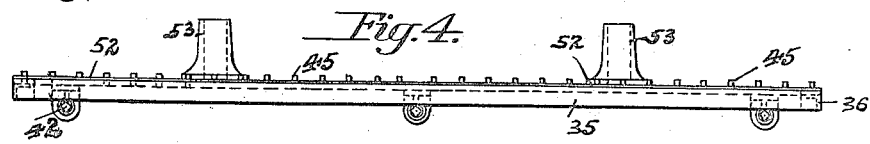
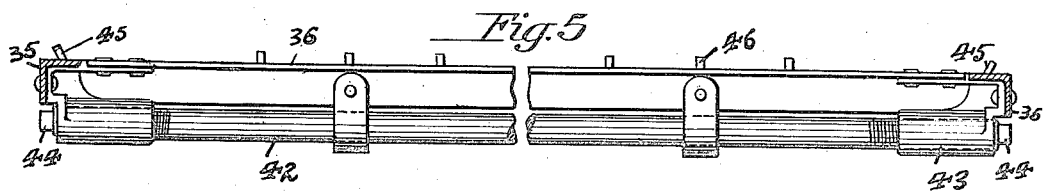
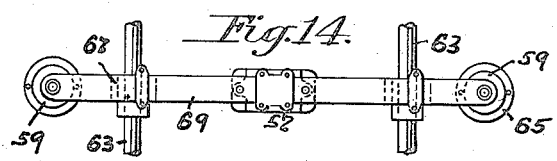
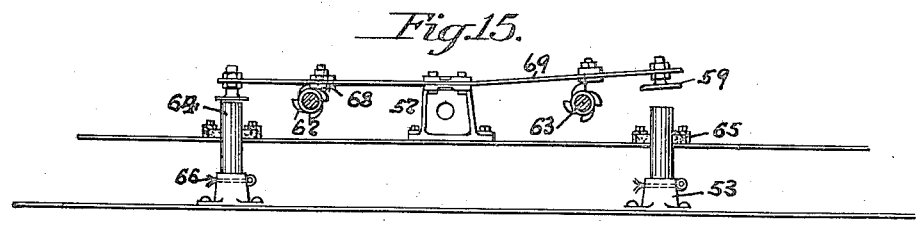

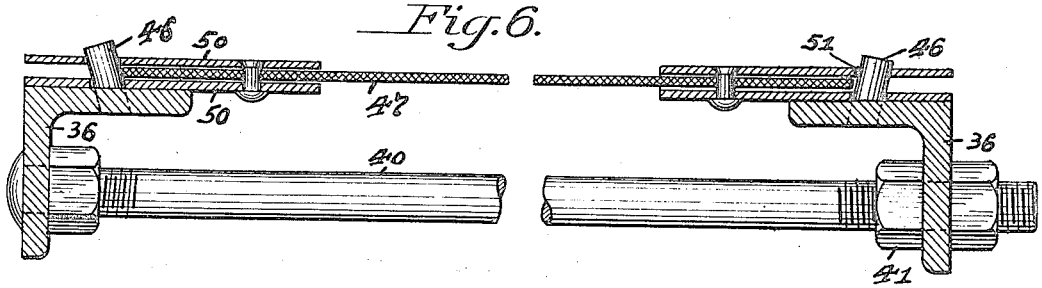
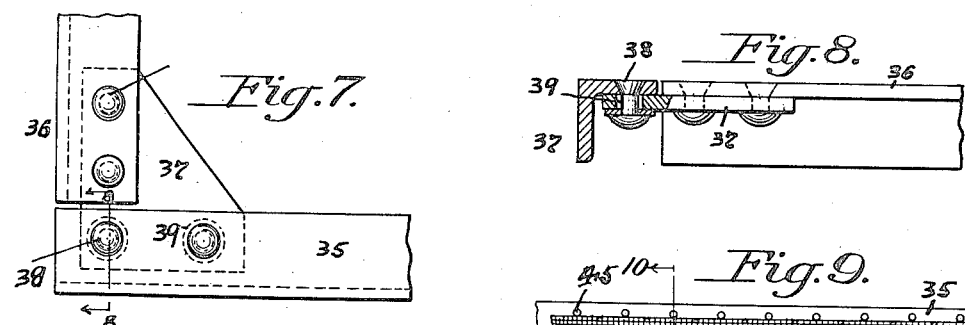
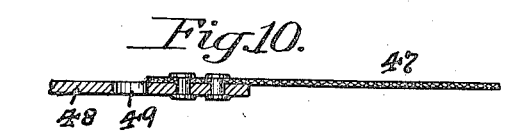
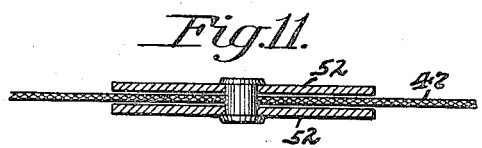
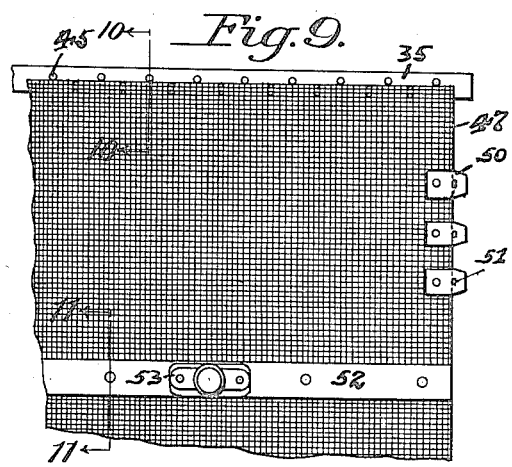
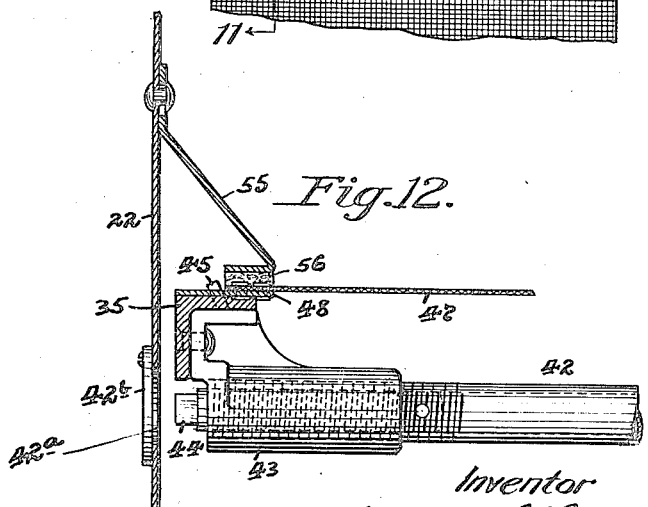

W. J. BELL.
SCREENING DEVICE.
APPLICATION FILED NOV. 3, 1916.
1,247,620.
Patented Nov. 27, 1917.
5 SHEETS—SHEET 5.
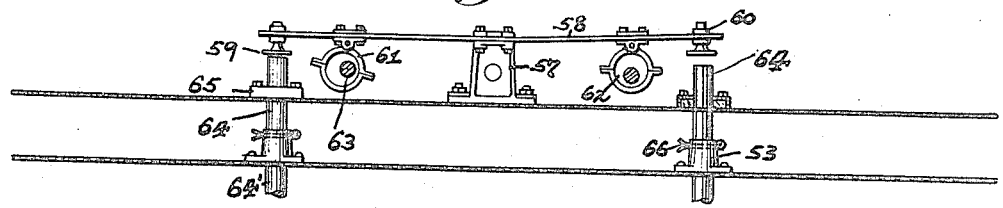
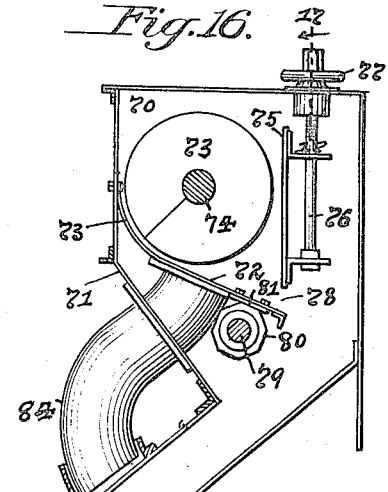
Witnesses
J. M. Geoghegan.
F. E. Broderick.
Inventor
Willard J. Bell,
By J. N. Cooke,
Attorney.

UNITED STATES PATENT OFFICE.

WILLARD J. BELL, OF NEWAYGO, MICHIGAN, ASSIGNOR TO THE W. S. TYLER COMPANY, OF CLEVELAND, OHIO, A CORPORATION OF OHIO.

SCREENING DEVICE.

1,247,620.	Specification of Letters Patent.	Patented Nov. 27, 1917.

Application filed November 3, 1916. Serial No. 129,333.

*To all whom it may concern:*

Be it known that I, WILLARD J. BELL, a citizen of the United States, and a resident of Newaygo, in the county of Newaygo and State of Michigan, have invented a new and useful Improvement in Screening Devices; and I do hereby declare the following to be a full, clear, and exact description thereof.

My invention pertains to screening devices, and especially relates to screening devices of the character in which the material to be screened is fed to an automatically vibrated screen.

Broadly speaking, it is the object of my invention to improve generally upon devices of the above nature. Among the more particular objects of my invention are: to provide a screening device in which the mechanism for vibrating the screen cloth will have a maximum efficiency in imparting effective vibrations; to provide a screening device in which the screen cloth can be more readily attached to and removed from its supporting frame than has hitherto been possible, while still permitting the screen cloth to be properly and evenly stretched; to provide a screening device in which there will be no liability of the unscreened material to find its way over the edge of the screen cloth, and thus become mixed with the screened material; to provide a screening device in which the material will be automatically fed, in a uniform manner, to the surface of the screen; to provide a screening device in which the feed mechanism can readily be taken apart, for cleaning or the like; and to provide for directing all unfed material to a suitable place, such, for instance, as the receptacle for the coarse material (tailings) resulting from the screening operation, or the receptacle containing the original unscreened material. Other and further objects of my invention will appear from the following specification, taken in connection with the claims forming a part thereof.

In order that my invention may be fully understood, I have described, by way of example, one embodiment thereof in the following specification, and shown the same in the accompanying drawings. It is to be understood, however, that my invention may be embodied in other forms, and that changes may be made in the form described and shown, without exceeding the scope thereof, as defined in the appended claims.

In the drawings:

Figure 1 is a side view of a screening device constructed in accordance with my invention, part of the same being broken away in order better to display the parts;

Fig. 2 is a front view of the device shown in Fig. 1;

Fig. 3 is a plan of the screen frame, showing the screening member attached thereto;

Fig. 4 is a side view of the screen frame;

Fig. 5 is an enlarged transverse section through the screen frame, with the screening member removed therefrom, the section being taken on the line 5—5 of Fig. 3, looking in the direction of the arrows;

Fig. 6 is an enlarged section through the screen frame and screen cloth, the section being taken on the line 6—6 of Fig. 3, looking in the direction of the arrows, and the center part of the figure being broken away;

Fig. 7 is a detail view of a corner of the screen frame, showing the means of slidably connecting the frame bars together;

Fig. 8 is a section on the line 8—8 of Fig. 7, looking in the direction of the arrows;

Fig. 9 is a fragmentary view showing a corner of the screening member;

Figs. 10 and 11 are enlarged detail sections, taken on the line 10—10 and 11—11, respectively, of Fig. 9;

Fig. 12 is an enlarged detail sectional view, showing a portion of one side of the screen frame and screen cloth in its associated relation with the housing of the screening device, and illustrating the means of access to the stretcher bars, and the means of preventing leakage of the material over the edge of the screen, the section being taken as, for instance, on the line 12—12 of Fig. 1;

Fig. 13 is a side view showing one form of hammering device;

Figs. 14 and 15 are a plan and a side view, respectively, of another form of hammering device;

Fig. 16 is a sectional view, taken on the line 16—16 of Fig. 2, showing the feed box and devices associated therewith;

Fig. 17 is a detailed sectional view, taken on the line 17—17 of Fig. 16;

Fig. 18 is a perspective view showing a screening device constructed in accordance with my invention in a duplicate form—i. e., with two screens disposed side by side in one casing;

Fig. 19 shows a portion of the feed box with the front plate removed, displaying the means of removably supporting the screw conveyer in the feed box;

Fig. 20 is a side view of the parts shown in Fig. 19; and

Fig. 21 is a perspective view showing the bearing slide for the screw conveyer.

Like reference characters refer to like parts throughout the several figures of the accompanying drawings.

The form of my invention shown herein comprises a housing having a front wall 20, side walls 21 and 22, a floor 23, and a rear wall 24. The housing has a hinged cover 25, which carries a hammering device for vibrating the screens contained in the housing. The cover 25, when lowered, closes the top of the housing; but it may be raised at will, to permit inspection of, and access to, the screens contained in the housing. In the device shown, the housing has mounted therein two screens, one being disposed below the other; but one screen, or three or more screens, may be used, in accordance with the requirements of the operation to be performed.

The housing is supported, at its lower front end, upon trunnions 26, mounted in stands 27, and is supported at its rear end, by uprights 28, the upper ends of which are threaded into brackets 29, carried by the housing, and the lower ends of which are threaded into stands 30. The threads at the upper and lower ends of the uprights 28 run in opposite directions; so that, by rotating these uprights, the inclination of the housing can be adjusted at will. The stands 30 are connected to the stands 27 by means of slotted braces 31.

At its upper part, the housing is provided with a feed box having therein a conveyer, so constructed as to distribute the material to be screened evenly over the width of the screen surfaces. The material falls from the feed box onto the upper end of the top screen, and passes therethrough onto the lower screen, there being thus three products, viz.—"tailings", which have not passed the top screen; "intermediates", which have not passed the second screen; and "fines". The tailings, intermediates, and fines, are directed to suitable receptacles through delivery spouts 32, 33 and 34, respectively.

The upper and lower screens are similar, except in so far as the size of mesh is concerned, and a description of one of them, therefore, will be sufficient. Each screen consists of two parts—viz. a screening member, which is made up of screen cloth, reinforced as will be described below, and a screen frame, upon which the screening member is stretched (Figs. 3 to 12, inclusive). The screen frame comprises a pair of side bars 35, in the form of angle irons, and a pair of end bars 36, disposed with respect to one another so as to form a rectangle. The connection between the side bars and the end bars is made by means of gusset plates 37 (Figs. 7 and 8). These gusset plates are riveted fast to the end bars 36, and are secured to the side bars 35 by means of rivets 38 which enter the side bars and pass through enlarged holes 39 in the gusset plates. In this way, relative movement between the side bars and the end bars, under the action of the stretcher bars to be described below, is permitted.

Extending longitudinally of the screen frame, at the lower side thereof, are a pair of braces 40, the ends of which pass through the bars 36. The braces 40 are longitudinally adjustable by means of nuts 41 (Fig. 6). Extending laterally across the screen frame, at the lower side thereof, are three stretcher bars 42 (Fig. 5), the opposite ends of which are threaded in alternate directions and enter sockets 43 secured to the side bars 35. The ends of the stretcher bars 42 project beyond the sockets 43 and take the form of bolt heads 44; so that, by rotating the bolt heads at either side of the screen frame, the side bars 35 can be moved away from each other, thereby to stretch the screen, as will be described below. Apertures 42$^a$, having pivoted closures 42$^b$, are formed in the sides of the housing, to permit ease of access to the bolt-heads 44. The side bars 35 are provided with a series of upwardly-extending outwardly-inclined securing pegs 45, for securing the screening member as will be described below. Likewise the end bars 36 are provided with sets of securing pegs 46.

The screening member (Figs. 3 and 9 to 11) comprises a rectangular sheet 47 of screen-cloth, the sides of which have riveted thereto longitudinal metal strips 48 (Fig. 10), these strips having holes 49 formed therein for engagement with the pegs 45 of the side-bars of the screen-frame. Along its ends, the screen cloth 47 has riveted thereto a plurality of metallic clips 50, each of which is formed with a hole 51 for engaging with one of the pegs 46 of the end bars of the screen-frame. Extending longitudinally down the middle of the screen-cloth 47 is a bar 52, which is made up of two metallic strips disposed one on each side of the screen-cloth and riveted together. The bar 52 has secured thereto a pair of sockets 53 for receiving the impact posts of the hammering device.

In connecting the screening member with the screen frame, the side strips 48 are placed upon the side bars 35 of the frame, with the pegs 45 extending through the holes 49, and with the pegs 46 of the end bars extending through the holes 51 of the clips 50. The screening member having been thus placed in position, it is stretched by moving the frame bars apart. This is readily effected by manipulating the bolt heads 44 of the stretcher bars 42.

The above construction of screen has manifold advantages. In the first place, it makes possible an accurate and uniform stretching of the screen cloth. In the second place, it permits a worn or broken screen cloth to be removed and replaced with great ease and without the necessity of expert skill on the part of the workmen. In the ordinary form of screen, where the screen-cloth is permanently attached—as by means of rivets or the like—to the frame, whenever a user needed to replace the screen-cloth, he had to take out the rivets, and then rivet on a new cloth. The riveting on of the new cloth was a very difficult operation to perform properly, owing, among other things, to the necessity of correctly stretching the cloth when riveting it in place. The whole operation was a very costly one, and was often performed improperly, owing to the inavailability of sufficiently skilled labor, with the result that the efficiency of the screening device suffered. This is all avoided by the screen of my invention; since, with its use, it is only necessary, when replacing a worn or broken screen-cloth, to slack off the stretcher bars 42, whereupon the old screen-cloth can be removed from the pegs and a new one put in place, requiring only the tightening of the stretcher bars for the screen to be ready for use again. Where a reasonably stiff screen-cloth is in use, it will automatically disconnect itself from the pegs, by sliding up the inclined faces of the latter as the side bars move toward each other in the slacking off of the stretcher bars. By the same simple process, a screen-cloth of a different character can easily and quickly be substituted for the one previously in use.

In securing the screens in position in the housing, they are rested upon suitable supports, such, for instance, as cross bars 54. Above each longitudinal edge of each screen is placed a bracket 55, to the lower end of which is sucured a packing strip 56 (Fig. 12) formed of felt or the like. The screen is first placed in position in the housing, and the brackets 55 are then placed in position, with the packing strips 56 bearing along the edges of the screen-cloth. The brackets are then pressed firmly down and are secured in position by being bolted to the sides of the housing.

It will be seen that the above construction provides a simple means for securing the screens in place in such a way that they can be easily removed and replaced, when desired. An important advantage of the construction lies in the fact that the packing strips 56 prevent the material being screened from finding its way over the edges of the screen-cloth into the screened material below and thereby causing a mixture of screened and unscreened material.

The hammering device (Figs. 1 and 13) includes a base 57 secured to the hinged housing-cover 25, toward the center of the latter. To this base is secured the center of a flat, resilient, metallic strip 58, which carries, at its ends, hammer heads 59. These hammer heads can be adjusted vertically, by means of nuts 60 of their stems. Secured to the spring strip 58, between the hammer heads and the base 57, are the straps 61 of a pair of eccentrics 62. The eccentrics 62 are mounted on the shafts 63, which extend laterally across the cover 25, and receive a rotary motion from the source of power. The hammer heads 59 coöperate with impact posts 64, which are preferably formed of hard wood, and which pass through boxes 65, having felt washers therein, carried by the cover 25. The engagement of the posts 64 in the boxes 65 is of such a nature as to be dust proof and yet permit the posts to slip out of the boxes, when the cover 25 is swung upward about its hinge. The posts 64 engage in the sockets 53 of the top screen, being secured therein by means of split pins 66, or the like.

Posts 64', similarly secured in the sockets 53 of the second screen, engage against the bottoms of the sockets of the top screen, whereby the vibration is transmitted through to the second screen.

By the spring mounting of the hammer heads 59, they are permitted to spring back after each blow upon the impact posts. In this way the screening surface is free to vibrate immediately after each blow has been given. This is not the case in the ordinary vibrating screen, in which the hammers usually rest upon the impact blocks for a while after each blow, the result of such resting of the hammer heads upon the impact blocks being to deaden the vibration of the screen. The hammering device described above imparts a rapid series of light hammer blows (about four hundred per minute) to a tightly stretched screen, and thus results in a rapid continuous vibration of the latter. In this way a greater efficiency of the screening operation is obtained than was possible with the relatively slow and heavy blows, accompanied by intermediate rests of the hammer heads, of the ordinary mechanisms. The adjustable mounting of the hammer heads permits them to be raised and lowered, to insure that, on the recoil, the hammer heads will spring clear of the impact parts. The adjustment also permits increase or decrease of the strength of the hammer blows, to give the greatest screening efficiency for the particular work in hand.

In Figs. 14 and 15, I have shown a form of hammering device which may be employed in place of that which has been described above. In this form of hammering device, multiple-toothed cams 67 are employed, on the shaft 63, in place of the eccentrics 62 described above. The teeth of these cams impinge against abutments 68, carried by a spring strip 69, which is of a similar nature to the spring strip described above.

The feed portion of the device comprises a feed box 70, having an inclined lower front wall 71, which extends upward from the top of the screen-housing. Secured within the feed box is a downwardly and rearwardly inclined feed board 72, the upper edge of which connects, by a curved portion 73, with the front wall of the feed box. Cooperating with the feed board 72 is a screw conveyer 73, mounted on a shaft 74, which extends laterally across the device, and is rotated from the source of power. The material to be screened is fed into the feed box at one end thereof (the right hand end, Fig. 2), and is moved by the conveyer 73, toward the other end of the box.

In order that the conveyer 73 may be readily removed to permit examination, cleaning or the like, the bearings 88 (Figs. 19–21) of its shaft 74 are mounted in slides 89, which engage in similarly shaped guides in the side walls of the feed box 70. These slides are normally kept in place by a removable front plate 90, with which the feed box is provided, and which engages against the fronts of the slides 89. The front plate 90 is held in position by angle irons 91 and 92, which are secured to the feed box 70 by bolts 93. Upon removal of the bolts 93 and angle irons 91, and 92, the front plate 90 may be taken off, whereupon the conveyer may be removed by the simple operation of drawing the bearing-slides 89 out of their guides.

Extending transversely across the feed box in a line with the feed board 72, is a gate 75, mounted upon a pair of vertical stems 76. These stems have a threaded engagement with hand wheels 77, rotatably mounted upon the outside of the feed box. By manipulating the hand wheels 77, the stems 76 and consequently the gate 75 can be raised or lowered, to adjust the width of the space 78 between the lower edge of the gate and the lower edge of the feed board 72. In this way the amount of material delivered to the screens can be regulated, and a uniform distribution across the width of the screens affected. Beneath the feed board 72, near its lower edge, is located a transverse shaft 79, which carries a plurality of cam wheels 80, which engage abutment members 81 on the lower side of the feed board. These cam wheels are of such a shape that their rotative engagement with the abutment members 81 will cause a rapid vibration of the feed board.

The feed device described above provides for a very uniform and even distribution of the material onto the screen; moreover, by means of the gate 75, it permits an accurate regulation of the amount of material being fed, which regulation can be effected during the working of the machine, and under observation of the screens.

Observation of the operation of the feeding device and the upper screen can be had through a rear door 82, located opposite the feed board 72, and just above the chute board 83, which directs the material from the feed board to the top screen. Observation of the lower screen can be had through a hinged door 83', located at the back of the housing, below the door 82.

At the end of the feed box 70, opposite to that at which the material is admitted, I form in the feed board 72 an aperture for receiving the end of an overflow pipe 84, through which any excess material, fed forward by the conveyer 73, may find exit. The pipe 84 may be connected with any suitable receptacle, according to how it is desired to dispose of the surplus material. In the embodiment now being described, I direct the surplus material to the receptacle for receiving the tailings. I effect this by inserting the lower end of the pipe 84 in an aperture formed in the cover 25. Beneath this aperture, the cover is provided with a chute 85, into which the material falls from the pipe 84. The chute 85 terminates just short of the end of the cover; so that the surplus material flows into the housing at the top of the lower end thereof, and finds its way out through the spout 32, with the tailings.

In the screening devices as at present used, the surplus material is usually allowed to accumulate at the far end of the delivery box, and is thus caused to flow, in increased quantities, over the screen at one edge of the latter, with the result that the vibration of the screen is retarded, and the meshes become clogged. This trouble is effectively remedied by the construction described above, which permits an even feed of material up to the extreme end of the feed board.

One of the advantages of the screening device described above, is that it can be put out with very little alteration of the parts either in single or in multiple form. Two similar screens can be arranged back to back, slanting in an opposite direction from a central feed box; or two single screens may be arranged side by side in a common housing. An example of this latter construction is shown in Fig. 18. Likewise, four screens may be arranged in one machine, in two pairs disposed back to back. These and other constructions can be followed without the necessity of making any material additional parts.

Having thus fully described my invention what I claim as new and desire to secure by Letters Patent is:

1. In combination, an expansible screen-frame, a screening member including a screen-cloth, and reinforcing means on the four edges of said screen adapted for effecting an interlocking connection between said screening member and said screen-frame, for the purposes set forth.

2. In combination, an expansible screen-frame, a screening member including a screen-cloth, said screen-cloth having reinforcing means along edges thereof, impact-receiving means carried by said screening member, and means for effecting an interlocking connection between said screening member, at said reinforcing means, and said screen-frame.

3. A screening member comprising a screen-cloth having reinforcing means at one edge thereof, said reinforcing means being formed with means for coöperating with a support to permit rigid attachment of the screening member thereto, and impact-receiving means carried by and secured to said screen-cloth.

4. A screening member comprising a screen-cloth having reinforcing means at its edges, said reinforcing means being formed with apertures for receiving rigid attaching members of a support, and impact-receiving means carried by and secured to said screen-cloth.

5. The combination with an expansible screen frame having rigid lugs extending outwardly on an angle on two opposed portions thereof, of a screening member, said screening member comprising a screen-cloth adapted to be attached, at opposite edges, to said portions of said screen frame, and means for reinforcing said screen cloth at the edges to be attached to said frame, said reinforcing means being formed with apertures for coöperating with the rigid lugs of said screen frame.

6. The combination with an expansible screen frame having rigid attaching means on two opposed portions thereof, of a screening member, said screening member comprising a screen-cloth adapted to be attached, at opposite edges, to said portions of said screen frame, means for reinforcing said screen cloth at the edges to be attached to said frame, said reinforcing means being formed with attaching means for coöperating with the attaching means of said screen frame, and impact-receiving means carried by and secured to said screen-cloth.

7. The combination with a screen, and means for vibrating said screen, of a member engaging an edge of said screen from above and having means for following said screen when vibrating, thereby to prevent flow of the material being screened over such edge.

8. In a screening device, an inclined screen, means for vibrating said screen, and packing members having friction engagement with the inclined edges of said screen from above, thereby to prevent the material being screened from flowing over said edges.

9. In a screening device comprising a casing and a screen mounted therein, screen-vibrating means comprising an impact member rigidly mounted on the screen, a hammer coöperating with said impact member, a resilient support for said hammer rigidly mounted on said casing, and means for vibrating said support, to cause said hammer to impart a series of recoiling blows to said impact member.

10. In a screening device, comprising a casing having screens therein screen-vibrating means comprising an impact member rigidly mounted on the screen, a hammer coöperating with said impact member, a resilient support for said hammer, said support being rigidly secured at its center to said casing means for vibrating said support, to cause said hammer to impart a series of recoiling blows to said impact member, and means for adjusting said hammer vertically on said support with respect to said impact members, for the purposes set forth.

11. In a screening device, screen-vibrating means comprising an impact member rigidly secured to the screen, a hammer coöperating with said impact member, a flat spring carrying said hammer at one end, means for rigidly supporting said spring at the other end, and means for imparting vibrations to said spring between said support and said hammer, for the purposes set forth.

12. In a screening device, screen-vibrating means comprising an impact member rigidly secured to the screen, a hammer coöperating with said impact member, a flat spring carrying said hammer at one end, means for rigidly supporting said spring at the other end, means for imparting vibrations to said spring between said support and said hammer, and means for vertically adjusting said hammer on said spring, for the purposes set forth.

13. In combination, an expansible and contractible screen frame, means for effecting the expansion and contraction of said screen-frame, a screen cloth, and means for attaching said screen-cloth to said frame, said attaching means being constructed to secure said screen-cloth to said frame when the latter is expanded, and detachably release said screen-cloth when the frame is contracted.

14. A screening member comprising a frame, a screen-cloth having metallic reinforcing member permanently secured to two opposed side edges thereof, said members having apertures therein for receiving attaching lugs on said frame, said lugs extending upwardly and outwardly on an angle, and a plurality of attaching clips having apertures therein are secured to the opposed ends of said screen-cloth, and are adapted to receive attaching lugs on said frame.

15. A screening member comprising a frame, a screen-cloth having metallic strips permanently secured to two opposed edges thereof, said strips having apertures therein for receiving rigid attaching lugs secured in said frame and extending upwardly and outwardly on an angle.

16. In a screening device a screen member comprising a frame composed of side bars, end bars, said side bars being adjustably mounted on said end bars, longitudinal adjustable braces secured in said end bars, stretcher bars extending transversely of said frame and engaging said side bars and adapted to adjust the same, a plurality of lugs on said frame and extending upwardly and outwardly on an angle, a screen cloth having metallic strips permanently secured to two opposed edges thereof, said strips having apertures therein for receiving a portion of said lugs, and means on the ends of said screen cloth for receiving the remainder of said lugs.

17. In a screening device comprising a casing, and a screening member, means for vibrating said screening member, said means comprising impact bars rigidly secured to said screen, a hammer coöperating with said bars, a spring carrying said hammer, said spring being rigidly mounted on said casing, and means mounted on said casing and coöperating with said spring for actuating said hammer.

18. In a screening device comprising a casing, and a screening member, means for vibrating said screening member, said means comprising a pair of rigid impact bars secured to and carried by said screening member, a flat spring rigidly secured at its center to said casing, hammers on each end of said spring adapted to coöperate with said impace bars, and means adjacent each hammer for vibrating it.

19. In a screening device comprising a casing, and a screening member, means for vibrating said screening member, said means comprising a supporting bar carried by and secured to said screening member, a pair of rigid impact bars secured to and carried by said supporting bar, a flat spring rigidly secured to said casing, vertically adjustable hamers on each end of said spring adapted to coöperate with said impact bars, and means mounted on said casing for vibrating each of said hammers separately.

20. A screening member comprising a frame, a screen cloth having metallic strips secured to opposed edges thereof, said strips having apertures therein for receiving rigid attaching lugs secured in a mounted frame and extending outwardly on an angle.

21. The combination with an expansible screen frame, comprising side and end bars, having rigid lugs extending outwardly on an angle on said side and end bars, of a screening member, comprising a screen cloth adapted to be attached to said side and end bars, and means for reinforcing said screen cloth at its edges, said reinforcing means formed with apertures for coöperating with said lugs.

In testimony whereof, I the said WILLARD J. BELL have hereunto set my hand.

WILLARD J. BELL.

Witnesses:
M. P. REYNOLDS,
V. OTT.